March 27, 1934.  J. T. MORGAN  1,952,561
WELDING SPLICER
Filed May 12, 1930
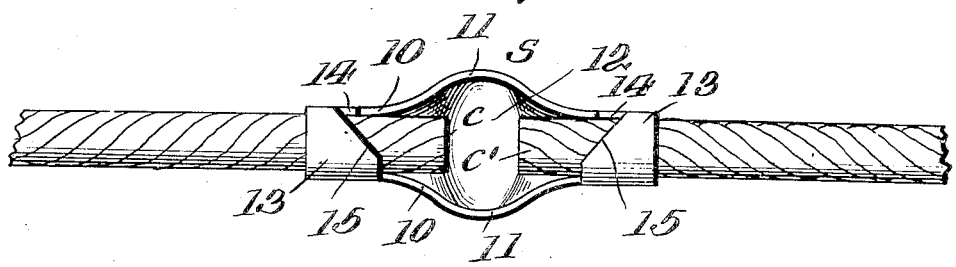
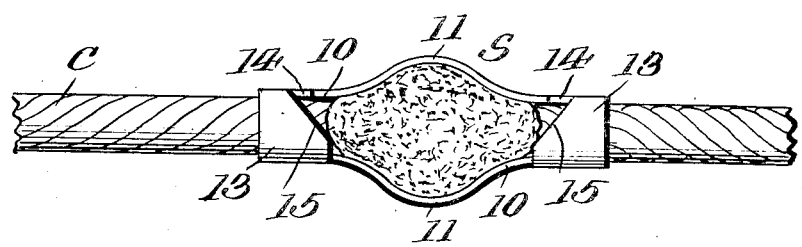
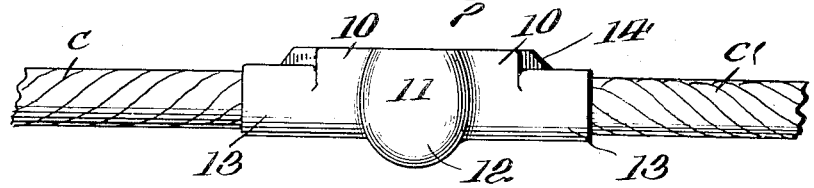
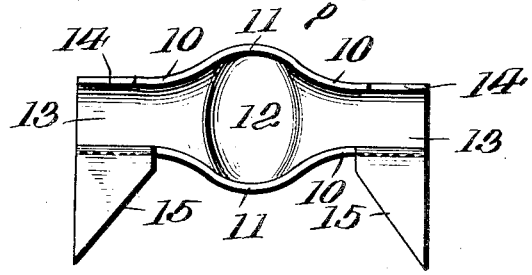

Patented Mar. 27, 1934

1,952,561

UNITED STATES PATENT OFFICE 1,952,561

WELDING SPLICER

John T. Morgan, Charleston, W. Va.

Application May 12, 1930, Serial No. 451,777

2 Claims. (Cl. 173—263)

This invention is a device for splicing the ends of conductor cables and the like.

One of the objects of the invention is to provide a simple device by means of which severed ends of conductor cables, etc., or the ends of different cables may be held in fixed relation with respect to each other, while being welded. A further object is to provide a splice member having means providing a chamber around the ends of the cables to be welded, so that the puddled welding material will be retained in splicing engagement with the ends to be joined during the welding operation. A further object is to provide simple means for emergency repair of conductors which have been accidentally cut or broken while in operation.

The invention will be hereinafter fully set forth and particularly pointed out in the claims.

In the accompanying drawing: —

Figure 1 is a top plan view illustrating the device with the cable ends in position before the welding operation. Figure 2 is a similar view illustrating the parts after the welding operation. Figure 3 is a side elevation of the splice member. Figure 4 is a view illustrating the blank before attaching to the cables to be spliced.

Referring to the drawing, S designates a welding splicer constructed of metal capable of withstanding welding temperatures, and C, C' indicate the severed end portions of a cable which has been cut or broken, or two ends of different cables which are to be spliced.

The splicer S consists of an elongated trough-like member having upstanding longitudinally disposed side walls 10 which at the end of the splicer are provided with portions capable of engaging longitudinal portions of adjacent cable ends which are to be spliced. The trough-like member and the side walls are gradually widened from the ends to the middle thereof to provide a cup-like main portion, the bottom of which is provided with a depressed gutter-like portion 12. The portions of the side walls 10 contiguous to said depression 12 are provided with outward vertical bulges 11 coinciding with said depression, so as to provide a gutter-like anchorage for the welding metal which is employed as a bond between the adjacent cable ends.

The ends of the splicer S beyond the sides which engage the cable ends are provided with cable engaging clips 13, which are shaped to closely embrace the cables C, C'. The clips may be formed in any desired manner, but it is preferred to construct one side wall 10 somewhat shorter than the other side wall and to provide the longer wall with beveled end edges 14. The shorter side wall at each end is provided with integral laterally disposed wing-like portions 15 extending from the end edges of the wall to the ends of the body, the inner edge of each wing being beveled so that when the wing portion is bent over a cable end lying in the trough body and engaged by the sides thereof, the beveled edges of the wing portions will abut the beveled end edges of the shorter side wall, so as to conform closely to the cross sectional contour of the cable. By this means the splicer acts somewhat in the nature of a splint closely and more or less rigidly engaging the adjacent cables and holding the ends of the cables in approximately fixed relation without bringing any appreciable strain upon the welded bond within the splicer.

In practice, the end portions C, C' of the cables to be welded are placed within the trough-like body, so that their extremities lie adjacent to the transverse gutter formed by depressed portion 12 and the bulged portions 11. The clips 13 are then passed around the cables to firmly anchor them in juxtaposition. In the splicing operation welding material is applied in any well known or desired manner, preferably by the method followed in electric welding, a rod of welding metal is used as an electrode, and the metal is deposited into the transverse gutter as a result of the welding heat produced by the arc. It will be noted that the splicer S forms a receptacle in which the widened portions of the walls 10, the bulges 11 and the depression 12 provide space into which the molten welding metal may freely flow, so that said molten welding metal will fill the transverse trough to a sufficient depth to thoroughly cover and join the opposed ends of the cables. The splicer S therefore, becomes a permanent part of the conductor cable to which it is applied.

At the end of the welding operation, the ends of the metal will be integrally welded together so as to provide a close electrically-conductive joint, and after the parts are so welded, the splice S while serving as a reenforce at the joint, does not primarily serve as a conductor because the welded parts provide a direct conductive path of minimum resistance. The clamping lugs 15 on both ends of the device, also serve to absorb vibrations in either or both of the conductors.

The splice member may be constructed as a steel stamping, or of cast steel or iron, or of any other suitable metal capable of withstanding the welding temperatures.

The advantages of the invention will be readily understood by those skilled in the art to which it belongs. It will be particularly noted that a very simple device is provided by means of which conductor ends to be welded are firmly held in electrically connected juxtaposition with respect to a receptacle in which welding metal may be puddled, the clamping lugs being so designed that they may be engaged with conductors of different sizes. An important feature is that the device may be used advantageously as an emergency device for welding together conductors which have been cut off or broken.

Having thus explained the nature of the invention and described an operative manner of constructing and using the same, although without attempting to set forth all of the forms in which it may be made, or all of the forms of its use, what is claimed is:—

1. A welding splicer of the character described comprising an elongated trough-like member having upstanding longitudinal side walls provided with end portions capable of engaging longitudinal portions of adjacent cable ends to be spliced, said member and said side walls being gradually widened from said end portions to the middle of the splicer to provide a cup-like main portion, the bottom of said main portion having a transverse depression therein, the contiguous portions of the side walls having outward vertical bulges coinciding with said depression so as to provide a gutter-like anchorage for the welding metal in proximity to the adjacent ends of the cables to be welded, said widened portions, said bulges and said depression being so constructed and arranged as to permit free flow of molten welding material into engagement with said cable ends, and means at each end of the trough-like member and located beyond the cable engaging side portions for closely gripping the end portions of the cables to be spliced, and so constructed and arranged as to permanently retain the ends of the cables and the trough-like member in approximately fixed relation and to relieve the welded joint of strain after the weld has been completed.

2. A welding splicer comprising an elongated trough-like member having upstanding longitudinal side walls provided with end portions capable of engaging longitudinal portions of adjacent cable ends to be spliced, one of said side walls being longer than the other and having its end edges beveled downwardly and longitudinally, said member and side walls being gradually widened from said end portions to the middle of the splicer to provide a cup-like main portion, the bottom of said main portion having a transverse depression therein, the contiguous portions of the side walls having outward vertical bulges coinciding with said depression so as to provide a gutter-like anchorage for the welding metal, said widened portions, said depression and said bulges being so constructed and arranged as to permit free flow of molten welding material around and in contact with the said cable ends, and wing-like members on the ends of the shorter side wall, said wing-like members having beveled edges positioned to abut against the beveled end edges of the longer side wall, and so constructed and arranged as to permanently grip and rigidly hold the cable ends and the trough-like member in approximately fixed relation and to relieve the welded bond of strain after completion of the weld.

JOHN T. MORGAN.